United States Patent [19]

Miller

[11] Patent Number: 4,500,771
[45] Date of Patent: Feb. 19, 1985

[54] APPARATUS AND PROCESS FOR LASER TREATING SHEET MATERIAL

[75] Inventor: Richard A. Miller, North Huntingdon, Pa.

[73] Assignee: Westinghouse Electric Corp., Pittsburgh, Pa.

[21] Appl. No.: 435,443

[22] Filed: Oct. 20, 1982

[51] Int. Cl.³ .............................................. B23K 27/00
[52] U.S. Cl. ....................... 219/121 LH; 219/121 LJ; 219/121 LW; 219/121 LY
[58] Field of Search ..... 219/121 L, 121 LM, 121 LE, 219/121 LF, 121 LP, 121 LQ, 121 LR, 121 LH, 121 LJ, 121 LW, 121 LY; 148/9.5, 110, 111, 112, 120

[56] References Cited

U.S. PATENT DOCUMENTS

| | | | |
|---|---|---|---|
| 3,154,371 | 10/1964 | Johnson | 219/121 LW X |
| 3,848,104 | 11/1974 | Locke | 219/121 LW X |
| 4,046,986 | 9/1977 | Barker | 219/121 L X |
| 4,099,830 | 7/1978 | Whittle et al. | 219/121 LW X |
| 4,293,350 | 10/1981 | Ichiyama et al. | 148/9.5 |
| 4,354,090 | 10/1982 | Nilsen | 219/121 LD X |

FOREIGN PATENT DOCUMENTS 2039964B 8/1980 United Kingdom .

OTHER PUBLICATIONS

"The Making, Shaping and Treating of Steel", ed. H. E. McGannon, United States Steel (1971), pp. 964–979, 1157–1162.

Primary Examiner—C. L. Albritton
Attorney, Agent, or Firm—John J. Prizzi

[57] ABSTRACT

A reduction in ferromagnetic domain size is obtained with equipment and processes being capable of the high speed laser scribing of ferromagnetic sheet material. The invention involves the elastic bending of sheet material around an axis which is parallel to the direction in which it is being translated and then laser scribing the curved sheet material. A rotating optical device is used to repeatedly send a focused laser beam across the width of the curved sheet material.

21 Claims, 2 Drawing Figures

APPARATUS AND PROCESS FOR LASER TREATING SHEET MATERIAL

RELATED APPLICATION

G. C. Rauch and R. F. Krause, copending U.S. patent application Ser. No. 435,822 (assigned to the Westinghouse Electric Corporation), filed concurrently with the present application, entitled "Improved Loss Ferromagnetic Materials and Methods of Improvement". This application relates to methods of laser scribing ferromagnetic sheet material and the resulting sheet material produced.

R. F. Krause, G. C. Rauch and W. H. Kasner, copending U.S. patent application Ser. No. 435,444 (assigned to the Westinghouse Electric Corporation), filed concurrently with the present application, entitled "Laser Scribing Apparatus and Process for Using".

This application relates to high speed laser scanning machines and the processes for using them to scribe ferromagnetic sheet material and is hereby incorporated by reference.

BACKGROUND AND SUMMARY OF THE INVENTION

The present invention pertains to instruments, and the process of applying these instruments to the scribing of ferromagnetic material to refine magnetic domain size. It is especially concerned with laser scribing instrumentation and methods of using such instrumentation for the high speed scribing of ferromagnetic sheet.

The development of high permeability grain oriented silicon steel resulted in a significant reduction in core loss, especially at inductions greater than 1.5 T (15 KG). This reduction in loss has been achieved primarily by improvements in the degree of grain orientation. Separation of the components contributing to the overall core loss has shown that the improved losses obtained are due to a reduction in the hysteresis component of the core loss. Further loss reduction can be achieved by refining the 180° domain wall spacing, which results in a lowering of the eddy current component of core loss.

Over the past several years techniques have been developed to reduce the domain wall spacing by changing the magnetostatic or the magnetoelastic energy in the sheet. Insulative coatings that apply a tensile stress parallel to the rolling direction have been effective in reducing the domain wall spacing and the core loss. Mechanical, or physical scribing transverse to the sheet rolling direction is another technique that has been found to be effective in reducing domain spacing and lowering the losses. The disadvantages of mechanical scribing are that the insulative coating is disturbed, and the space factor is decreased.

Efforts to obtain the advantages of scribing without the aforementioned disadvantages have centered around the use of pulsed laser scribing techniques. It is known that irradiation of an iron-silicon alloy by a laser pulse of sufficient power density can vaporize material at the alloy surface causing a pressure shock wave to travel through the alloy causing dislocations and twins (see A. H. Clauer et al, "Pulsed Laser Induced Deformation in an Fe-3 Wt. Pct Si Alloy," Metallurgical Transactions A, Vol. 8A, January 1977 pp. 119–125). This deformation, like the deformation produced by mechanical scribing, can be used to control domain spacing. In fact, pulsed lasers have been applied to grain oriented electromagnetic steel sheet to produce shock wave induced arrays of deformation, see, for example, U.S. Pat. No. 4,293,350 and French patent application No. 80/22231 published on Apr. 30, 1981 (Publication No. 2,468,191 and European patent application No. 0033878 A2).

These processes have produced a need for the development of instrumentation and processes capable of laser scribing at the high speeds necessary to make scribing of large lots or heats of ferromagnetic material practical on a high volume, high throughput basis. The present invention addresses these needs.

Applicant has proposed a process for laser scribing of ferromagnetic sheet in which means are provided for curving the sheet in an arc and then scribing the sheet while it is curved.

In the proposed process the curved sheet would be translated in a direction parallel to the axis about which it is curved and past a laser beam traveling substantially perpendicular to the sheet's axis of curvature, thereby scribing magnetic domain refining lines in the magnetic sheet.

Included in this invention is the instrumentation required to carry out this process. In accordance with this invention this instrumentation includes a means for curving the sheet to the desired radius of curvature and a means for translating said sheet under a laser beam. The laser beam is scanned across the path of travel of the curved sheet by a rotating optical means for deflecting the beam through the arc length defined by the curved sheet, and onto the curved sheet surface.

Preferably said rotating optical means for deflecting is a polygonal device whose angularly related faces repeatedly reflect the laser light impinging on them as the device rotates, thereby directing the laser beam down to and across the curved sheet surface.

Preferably the means for curving the sheet are pairs of guide rolls having a concave and convex roll in each pair for curving the sheet.

Preferably the laser beam has been passed through a focusing lens prior to its being reflected.

The aforementioned and other aspects of the present invention will become more apparent upon examination of the drawings, which are briefly described below, in conjunction with the detailed description of the invention.

DETAILED DESCRIPTION OF THE INVENTION

Figure 1:
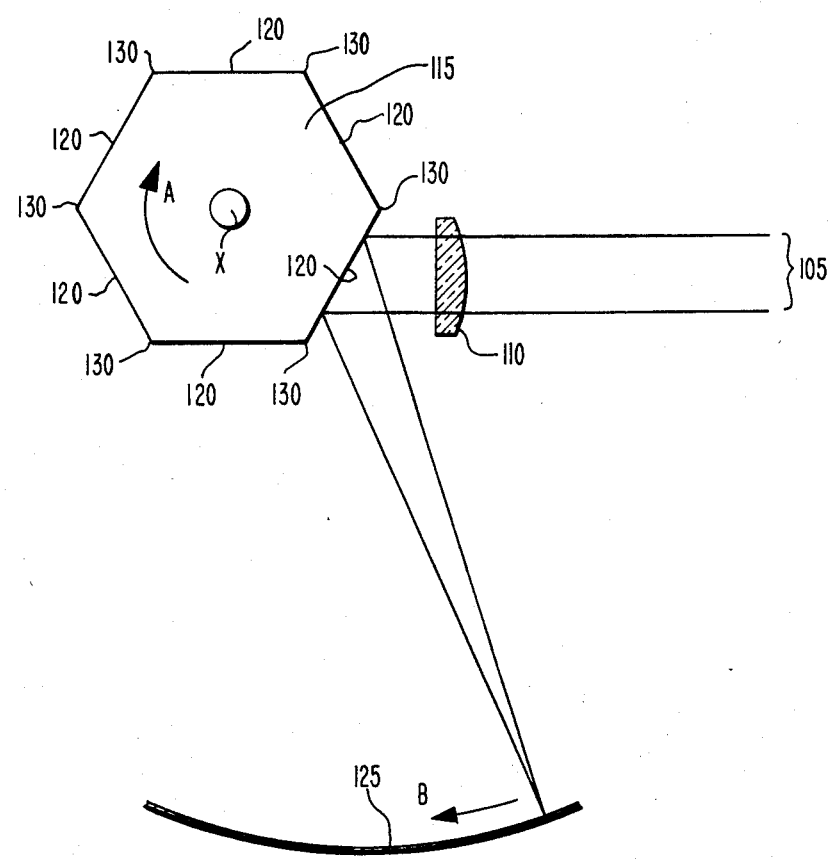
FIG. 1 shows a schematic cross section through an embodiment of a scribing apparatus according to the present invention.

FIG. 1 shows a schematic of an embodiment of the present invention. An expanded laser beam 105 is directed through a focusing lens 110 onto a reflective surface 120 of a polygonal device 115 rotating in direction A about axis X. The polygonal device 115 is a polygon on which a reflective coating has been applied to each of its sides 120. The reflective surface 120 reflects laser beam 105 down and onto the concave surface 125 of a curved ferromagnetic sheet. As surface 120 rotates away from the laser beam 105 the reflected laser beam is caused to travel across the width of sheet surface 125 in the direction B. This process is repeated as each face 120 is rotated through the path of the laser beam 105.

During the rotation of the device 115 there will be times when an edge 130 will be within the path of the laser beam 105. If the laser beam is on at this time at least a portion of the beam will be reflected to an area away from the sheet surface 125. In this case appropriate absorbing means (not shown) would have to be positioned around the rotating device to stop these stray beams. In the alternative, the laser source could be coupled to the rotating device 115 or the means causing it to rotate, such that the laser beam is on only when it will be entirely reflected onto the curved transformer sheet.

The focal point of the laser beam 105 as it is rotated by the device 115 describes a path that is parallel to the curved surface 125 and may be colinear with it.

The ferromagnetic sheet is being translated as it is being scribed in a direction substantially transverse (i.e. within ±45° of perpendicular) to the scribe lines being formed on it. For example, as shown in FIG. 1, the sheet would be traveling in a direction perpendicular to the plane of the paper.

Figure 2:
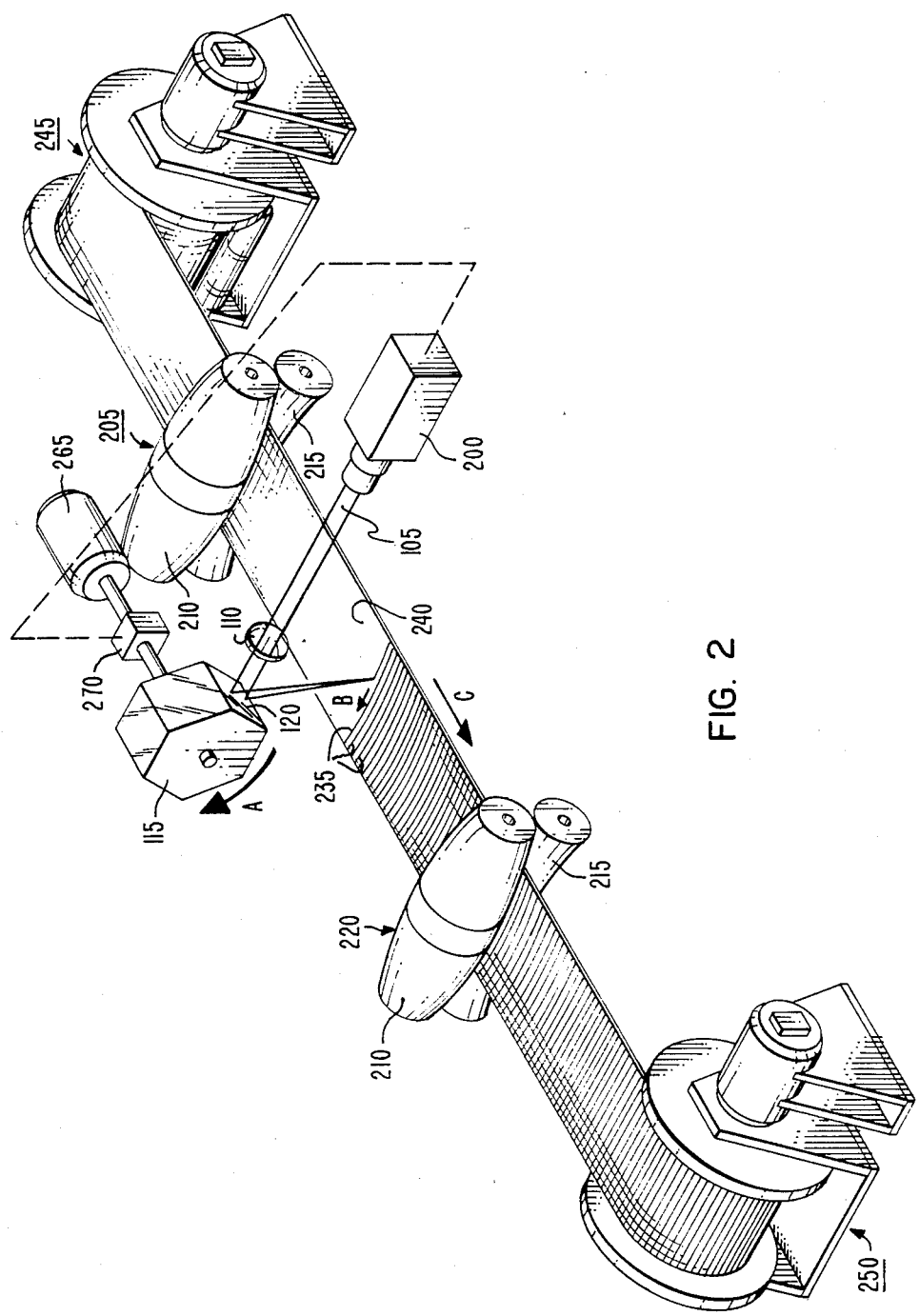
FIG. 2 shows a schematic perspective view of an embodiment of a scribing apparatus and process according to the present invention.

FIG. 2 shows a schematic perspective view of an embodiment of the present invention. A coil of flat ferromagnetic sheet material is shown mounted on a motor driven uncoiling reel 245. The sheet is threaded through two pairs of segmented rolls 205 and 220. Each pair of rolls having a convex roll set 210 and a matching concave roll set 215 which impart a curved shape to the sheet 240 without plastically deforming the sheet. These rolls are not externally driven and each segment in a roll rotates independently of the other segments. For 0.011 inch thick by 18 inch wide sheet, bend radii greater than 8" have been found to produce no detrimental effect on the steel, and radii of approximately 15 to 18 inches are contemplated. The minimum feasible radius will of course depend on steel thickness.

Located between the two pair of rolls 205 and 220 is the laser manipulation system. A laser source, which may be, pulsed, continuous wave, $CO_2$, Neodymium YAG or Neodymium Glass sends a laser beam through focusing lens 110 and onto the rotating mirror device 115 rotating in direction A. The beam is reflected off mirrored surface 120 and travels in direction B forming a scribe line 235 on the surface of the sheet 240 as it travels in direction C under the laser beam. While scribe lines 235 are visible in FIG. 2 for the sake of illustration, it is contemplated, that preferably, that the scribe lines produced would be invisible to the naked eye.

Variable speed motor 265 rotatably drives the mirrored device 115. Mounted on the shaft connecting variable speed motor 265 and mirrored polygonal device is a tachometer device 270 for measuring the orientation of the mirror device 115 and signally the laser source 200 when to fire laser beam 105 so that the beam is on only when it will be reflected onto sheet 240.

The translational speed of sheet 240 and the rotational speed of device 115 are matched so as to provide the desired distance between scribe lines on the steel.

After passing through the pair of segmented rolls 220 the elastically curved sheet is allowed to return to its original flat shape and coiled up on motor driven take up reel 250.

While FIG. 2 illustrates the use of the present invention as a separate rolling mill line, it is contemplated that the laser scribing system described can be also integrated into a continuous or semicontinuous already existing rolling mill line within the standard mill processing sequence for electrical steel sheet.

While the present invention has been illustrated with a polygonal device 115 having a hexagonal shape, it is contemplated that other polygonal shapes may also be utilized and may be preferred depending upon the specific requirements of each application as to scribe spacing, sheet width, and scan speed.

Other embodiments of the invention will be apparent to those skilled in the art from a consideration of this specification or practice of the invention disclosed herein. It is intended that the specification and examples be considered exemplary only, with the true scope and spirit of the invention being indicated by the following claims.

I claim:

1. A process comprising:
translating ferromagnetic sheet metal;
curving said translating ferromagnetic sheet metal; and scribing magnetic domain refining lines on the translating curved ferromagnetic sheet metal.

2. A process according to claim 1 wherein:
said translating curved ferromagnetic sheet metal is being translated in a direction parallel to its axis of curvature during said scribing of said ferromagnetic sheet metal.

3. A machine comprising:
a rotatable optical means for deflecting a laser beam through a range of angles;
a means for curving sheet metal in an arc;
a means for translating said sheet metal in a direction perpendicular to the curvature of said sheet material; and wherein said laser beam is deflected by said rotating optical means onto said arc and said arc defines a first line on said curved sheet material substantially perpendicular to the direction of translation of said sheet; and wherein additional lines parallel to and spaced from said first line are repeatedly formed by the same procedure.

4. A machining comprising:
a means for translating sheet metal;
a means for curving said sheet metal in an arc about an axis parallel to the direction of translation imparted to said sheet by said means for translating; and
a means for repeated scanning said sheet with a laser beam along paths that are substantially perpendicular to the direction of translation of said curved sheet.

5. A machine comprising:
a means for focusing a laser beam;
a polygonal mirror means;
means for rotating said polygonal mirror means about the rotational axis of symmetry of said polygonal mirror means;
means for curving a moving sheet metal surface to a predetermined radius of curvature;
said polygonal mirror means located in the laser beam path between said forcusing means and said sheet metal; and
wherein rotation of said polygonal mirror means repeatedly translates the focused laser beam across the width of, and substantially transverse to the direction of movement of said curved sheet metal; and wherein the arc defined by the focal point of said laser has substantially the same radius of curvature as said curved surface of said sheet and is within a fixed distance of said curved surface.

6. The machine according to claim 5 further comprising:
a laser beam source; and wherein said laser beam source sends a laser beam to said means for focusing.

7. The process according to claim 1 further comprising: returning said ferromagnetic sheet metal to the shape said ferromagnetic sheet metal had prior to scribing.

8. The process according to claim 1 wherein said curving involves only elastic deformation of said ferromagnetic sheet metal.

9. The process according to claim 1 further comprising: after scribing and during said translating step, returning said ferromagnetic sheet metal to the shape said ferromagnetic sheet metal had prior to scribing.

10. The machine according to claim 3 wherein said means for curving sheet metal in an arc is set up to produce a degree of curvature in said sheet metal commensurate with only elastic deformation of said sheet metal.

11. The process according to claim 1 wherein said ferromagnetic sheet metal is a grain oriented electrical steel sheet.

12. The process according to claim 1 wherein said scribing of magnetic domain refining lines consists essentially of repeatedly scanning a laser beam across the width of said translating curved ferromagnetic sheet metal.

13. A machine comprising:
a rotatable optical means for deflecting a laser beam through a range of angles;
guide roll means for curving sheet metal in an arc;
a means for translating said sheet metal in a direction perpendicular to the curvature of said sheet material; and wherein said laser beam is deflected by said rotating optical means onto and across the curved sheet metal, thus defining a first line on said curved sheet metal substantially perpendicular to the direction of translation of said sheet metal; and wherein additional lines parallel to and spaced from said first line are repeatedly formed by the same procedure.

14. The machine according to claim 13 wherein said means for translating sheet metal includes a motor driven take up reel for coiling the scanned sheet metal.

15. A machining comprising:
a means for translating sheet metal;
guide roll means for curving said sheet metal in an arc about an axis parallel to the direction of translation imparted to said sheet by said means for translating; and
a means for repeated scanning the curved sheet metal with a laser beam along paths that are substantially perpendicular to the direction of translation of said curved sheet metal.

16. A machining comprising:
a means for translating sheet metal;
a means for curving said sheet metal in an arc about an axis parallel to the direction of translation imparted to said sheet metal by said means for translating;
a means for repeated scanning the curved sheet metal with a laser beam along paths that are substantially perpendicular to the direction of translation of said curved sheet metal; and
wherein said means for translating sheet metal includes a motor driven take-up feel for coiling the scanned sheet metal.

17. The machine according to claim 15 wherein said means for translating sheet metal includes a motor driven take-up reel for coiling the scanned sheet metal.

18. The process according to claim 12 wherein said ferromagnetic sheet metal is a grain oriented electrical steel.

19. The process according to claim 2 wherein said ferromagnetic sheet metal is a high permeability grain oriented silicon steel.

20. The machine according to claim 13 further comprising:
a laser beam source; and wherein said laser beam source is optically aligned with said means for deflecting said laser beam.

21. The machine according to claim 15 further comprising:
a laser beam source; and wherein said laser beam source is optically aligned with said means for repeated scanning.

* * * * *